Patented July 20, 1943

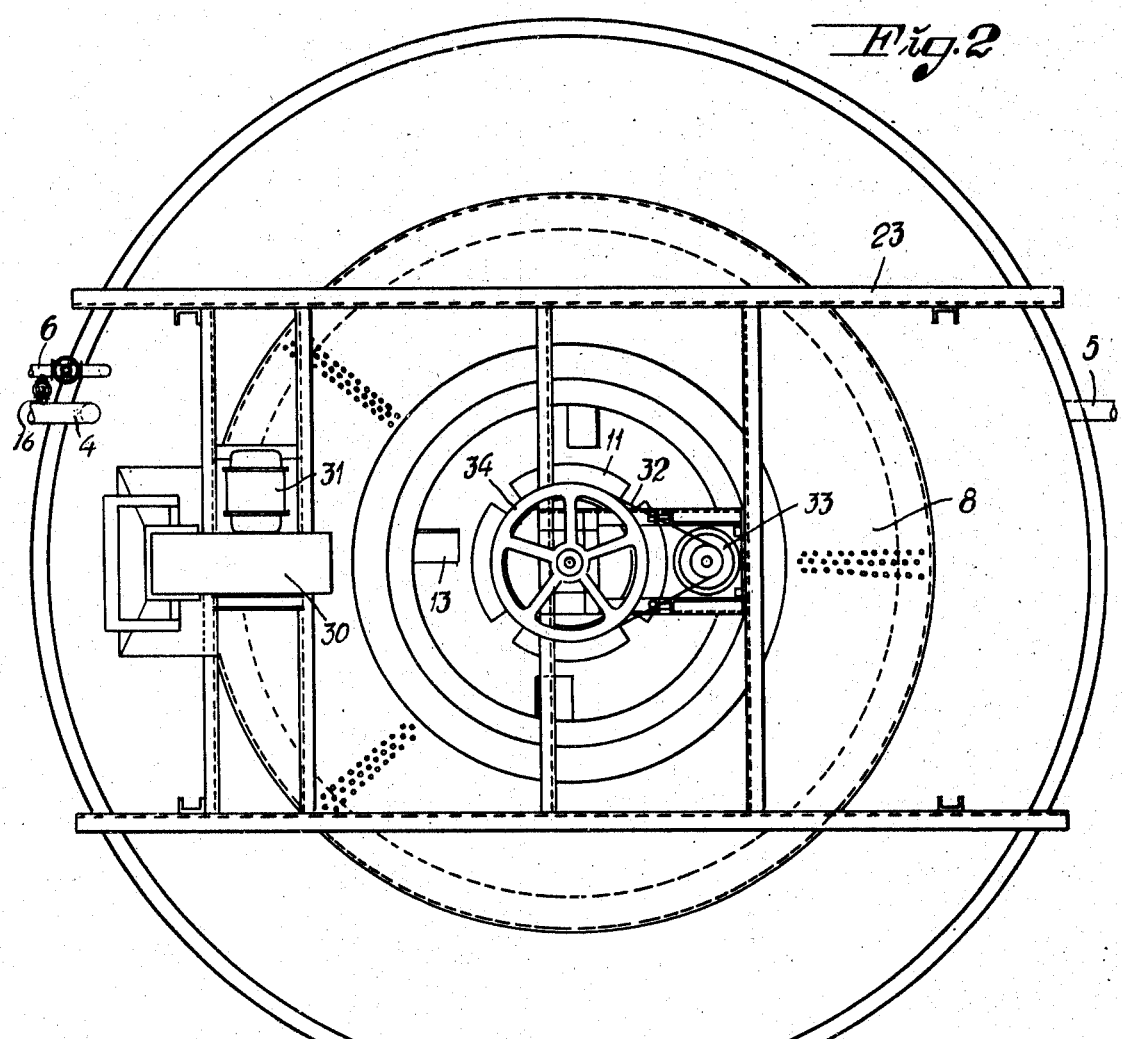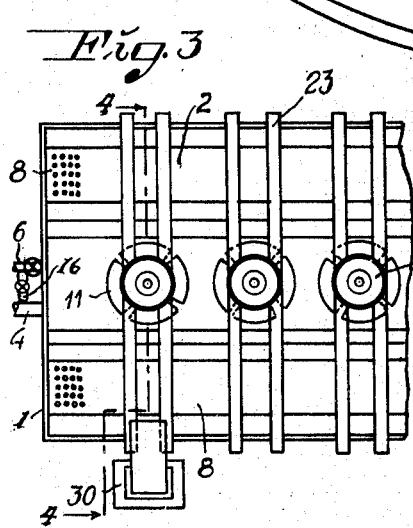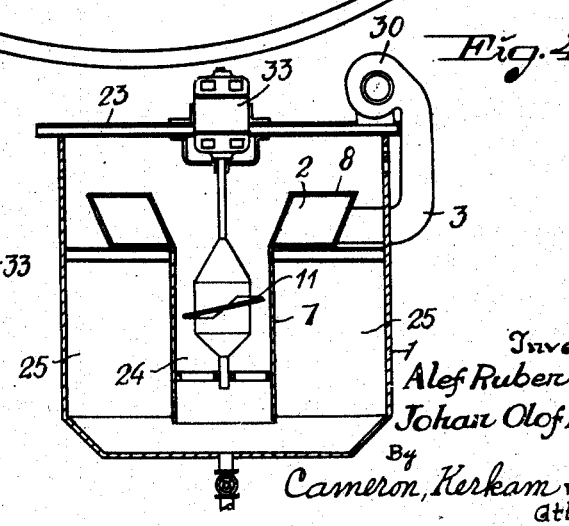

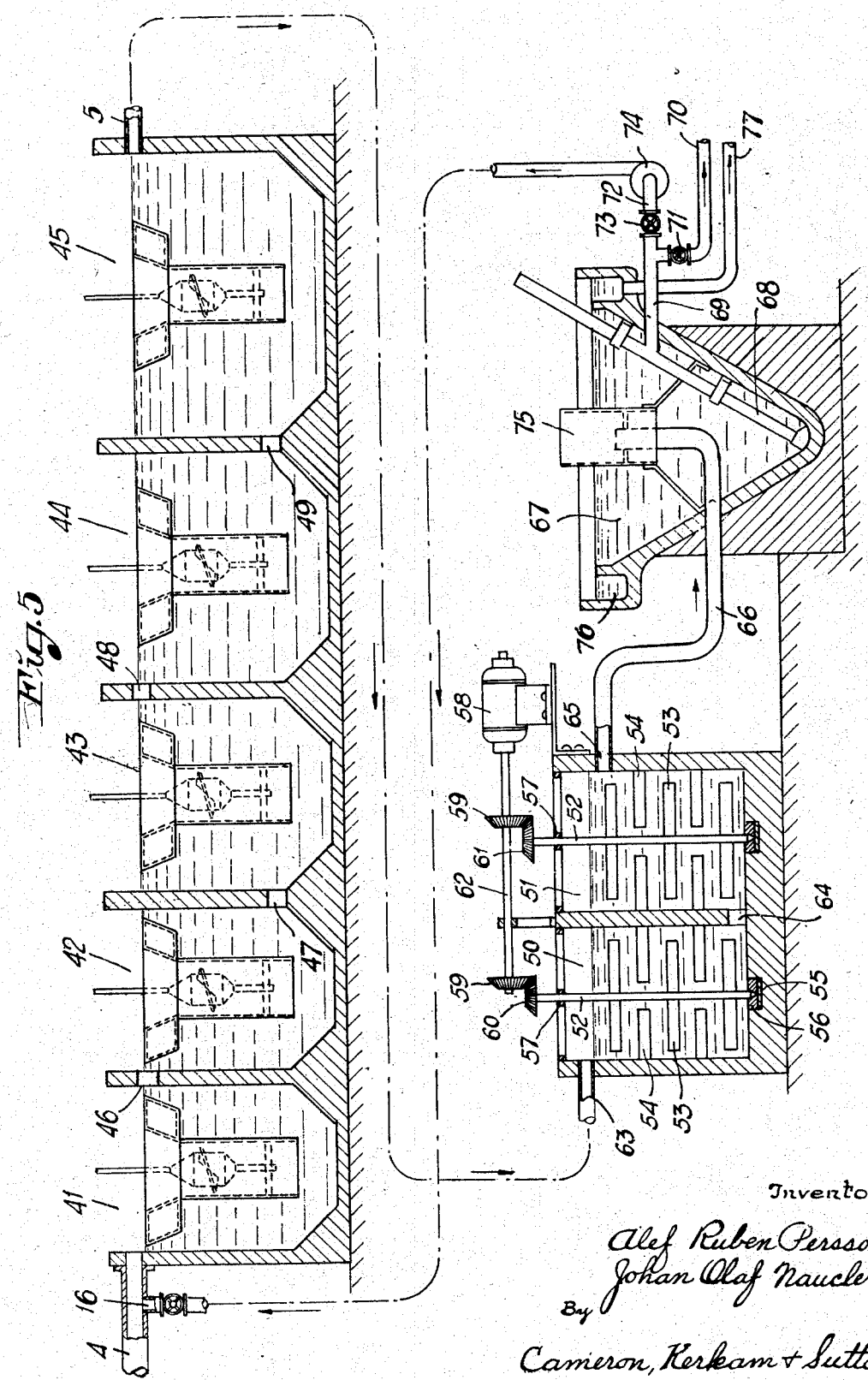

2,324,593

UNITED STATES PATENT OFFICE 2,324,593

METHOD FOR THE PURIFICATION OF SEWAGE

Alef Ruben Persson, Hedemora, and Johan Olof Nauclér, Stocksund, Sweden

Application January 30, 1939, Serial No. 253,648
In Sweden January 29, 1938

2 Claims. (Cl. 210—8)

(Granted under the provisions of sec. 14, act of March 2, 1927; 357 O. G. 5)

The present invention relates to the purification of waste waters such as sewage, and more particularly to the purification according to the method known as the activated sludge method.

It is an object of the present invention to provide a method and an apparatus requiring a reduced floor surface and having high efficiency. Another object is to attain a high degree of purification in a remarkably short time under economical utilization of the air employed and at a relatively low cost. Still another object is to obtain after the aeration step a residual liquor containing relatively little sludge.

Therefore the improved method according to the present invention consists in this, that the sewage mixed with activated sludge to form a mixed liquor is treated in an aerating tank or channel, with an oxygen-containing gas, preferably air, in such manner that only a part at a time of the mixed liquor will be aerated, separated from or connected with the bulk of the mixed liquor in the tank, and that the gas in a finely divided state is passed through a layer of said mixed liquor the thickness of which is small relatively to the liquid depth of the main quantity of the mixed liquor in the aerating tank, the air being introduced at one side of the layer under a pressure in excess of that prevailing outside the other side of the layer. It is also a feature of the invention that the mixed liquor is passed from said main quantity, across the place of aeration and back to said main quantity by means of rotary propelling means.

To be readily understood, the invention will now be described with reference to the accompanying drawings illustrating preferred embodiments of an apparatus according to the invention. It is, however, to be understood that the invention is not limited either to the features shown in the drawings or to the specific data given hereinbelow.

Referring to the drawings:

Fig. 2 is the apparatus shown in Fig. 1 seen from above;

Fig. 3 is a diagrammatic view of an embodiment equipped with a plurality of aerating units; and Fig. 4 is a vertical section through the apparatus according to Fig. 3.

Fig. 5 is a vertical section through the aerating unit, the agitating unit and the sedimentation unit.

Figure 1:
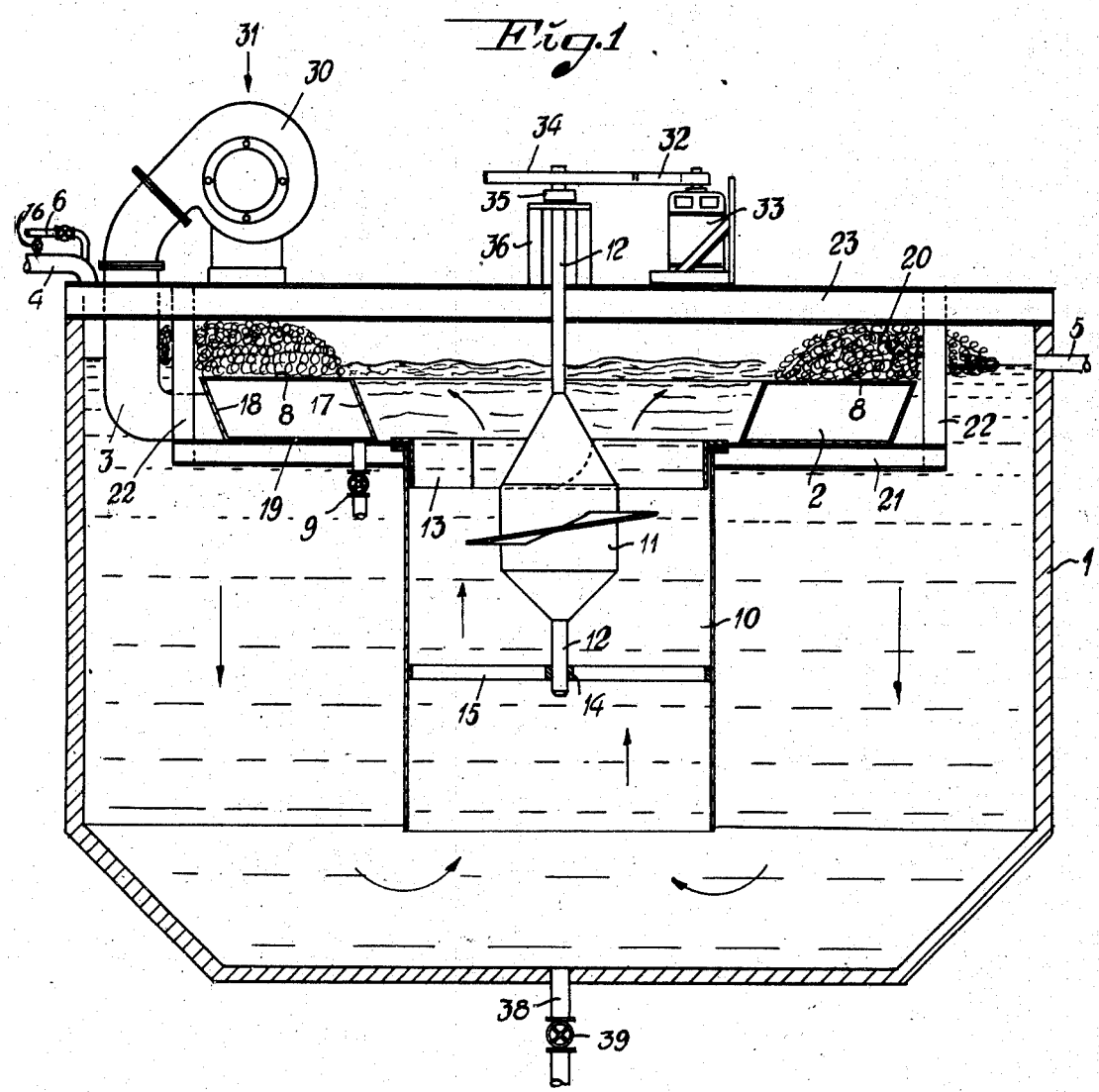
Fig. 1 is a vertical view of a preferred embodiment of the apparatus according to the invention.

With reference to the drawings, 1 designates an aerating tank of, for instance, sheet iron or concrete provided with an inlet pipe 4 for the sewage and an inlet pipe 6 for return sludge from a latter stage of the process. Alternatively the return sludge can be mixed with the fresh sewage prior to the introduction into the tank, for example through a pipe 16, in which case the pipe 4 may serve as inlet for the mixture of fresh sewage and return sludge. The tank is also provided with an outlet pipe 5 which serves as an overflow for the liquor. In the tank 1 the aerating device 2 is provided for finely dividing the gas with which the sewage is to be treated. The aerating device (or devices) embraces an inner space for the circulation means 11 to be explained more in detail further on, and consists generally of an annular box the top wall 8 of which is a strainer plate, the other walls of which 17, 18 and 19 being so shaped as to facilitate the drainage of any liquor which may leak in. Such liquor will be drained off through the drain cock 9 as shown, when the tank 1 is sufficiently emptied below its lower extremity. The inner side wall 17 is preferably inclined to expedite the flow of mixed liquor in the apparatus. The air box 2 communicates with a fan 30 through the duct 3 attached to the aerating box through the outer side wall 18.

The strainer plate 8 is provided with holes or slits which are made as small as possible without risk of clogging. The free admission area of the holes in case of substantially circular holes, or the equivalent circular area in the case the holes are oblong, should be less than 0.2 square centimetre, preferably about 0.08 square centimetre.

From the aerating device 2 extends centrally downwards a wide tube 10 which communicates with the central opening bounded by the wall 17 and is secured to the aerating box so as to offer only a small resistance to the streaming liquid. The tube 10 terminates near the bottom of the tank leaving a sufficient space for the mixed liquor readily to flow from the tank outside the tube into said tube. The cross-sectional area of the tube is preferably less than 15%, for instance 5%, of the total cross-sectional area of the tank. If the diameter of the tank is 3.5 metres, 8 decimetres will be a suitable diameter of the tube.

In said tube 10 a propeller 11 fitted on the shaft 12 is provided to bring about the circulation of the mixed liquor in the tank either upwards or downwards in the tube. The capacity of this circulation pump corresponds preferably to a 5 centimetre lift of a column of water. The shaft 12 rotates in the bearing 14 supported by the holder 15 secured to the tube 10 and in the upper bearing 35 which will be explained later. In the case the propeller is adapted to circulate the liquor upwards in the tube, baffles 13 are preferably provided in the upper part of the tube above the propeller so as to counteract the rotary movement of the liquor imparted to it from the rotating propeller.

For the purpose of drainage, the aerating tank 1 is provided with a drain pipe 38 containing a drain cock 39 at the bottom of the tank. The aerating device 2 and the central tube 10 attached thereto are supported by supporting bars 21 which are in turn supported by the pendant bars 22 secured to the girders 23 placed on the edge of the tank 1. The girders 23 also carry the fan 30 and its motor 31 as well as the motor 33, the belt 32, the pulley 34, fitted on the shaft 12, and the supporting frame 36 for the upper bearing 35 for the shaft 12, which parts all cooperate in driving the propeller 11. The aerating device should preferably be symmetrically placed in the tank.

The aerating device shown in Figs. 1 and 2 has an annular shape which is advantageous from a manufacturing point of view and also as offering good liquid streaming conditions.

A specific feature of the present invention resides in the combination of the following details, viz. an aerating device 2, a central conduit 10, a fan 30, propelling means 11, motors 31 and 33 as well as supporting means 21, 22, 23 and further accessory means as already mentoined into a removable unit. Such removable units may in any suitable number be employed in any receptacle containing a liquid needing aeration, e. g. in a sewage channel of adequate depth and width, preferably so as to work in series.

The embodiment shown in Figs. 3 and 4 comprises an aerating tank 1 extended in length in which two substantially parallel strainer plate boxes 2, 2 are disposed in the length direction thereof so as to form a free passage between the strainer boxes themselves, as well as between each of said strainer boxes and the long walls of the tank 1. From each of said strainer plate boxes 2 a partition wall 7 extends down to the neighbourhood of the bottom of the tank so as to form a central chamber 24 (corresponding to tube 10 of Figs. 1 and 2) and side chambers 25, 25, said central chamber communicating with said side chambers partly at the top of the tank over the strainer plates 8 and partly at the bottom of the tank under the partition walls 7, 7. In the central chamber 24 a plurality of propelling means similar to those shown in Figs. 1 and 2 are provided at a distance from each other. The air boxes 2 are, of course, also connected to a blowing apparatus such as a fan 30 for the air supply.

It is common for all embodiments described above that a central conduit 10 or 24 is provided. The propelling means 11 are located in this conduit. The cross-sectional area of the conduit is preferably less than, e. g. 5-10% of, the cross-sectional area of the tank outside the conduit. It is possible to circulate the mixed liquor in the tank either upwards in the conduit and downwards outside the conduit, or vice versa. The sludge having in the mixed liquor a settling tendency, which in one case was found to be about 2 metres per hour, will in the first-named case settle in the tank outside the central circuit in the direction of circulation, whereas in the latter case the sludge will settle or tend to settle in a direction opposite to the flow of the liquid thereby giving rise to a relative movement between the floccules of sludge and the liquid. By suitably choosing the rate and direction of circulation it is possible to regulate within wide limits the movement of the sludge in relation to the liquid proper.

The functioning of the apparatus is as follows. Assuming that the propeller 11 brings the mixed liquor to circulate upwards in the conduit 10, said liquor will flow over the strainer plate 8 through the holes of which the oxygen-containing gas, usually air, is pressed by the fan 30, thereby forming a foam layer 20 in which the air is intimately contacted with the mixed liquor. At this point the liquor will ordinarily be saturated to about 70%, depending at least partly on the temperature of the liquor and of the air. The velocity of the mixed liquor when passing over the strainer plate should preferably be less than 1 metre per second, 0.5-0.2 metre per second usually being a proper range of speed. By regulating the overflow at the exit 5, the height or thickness of the layer flowing over the strainer plate can be kept at the desired figure. The thickness of the layer should normally be more than 10 centimetres and preferably not exceed 50 centimetres. It is to be understood that the figures given relate to a liquid layer, and not to the foam layer which may be considerably higher. On leaving the aerating device, the mixed liquor flows downwards outside the conduit 10 or 24. On account of the greater cross-sectional area of this passage, the speed will be lowered and the microbes, such as bacterias, will be given time to act on the sewage so that the oxygen absorbed will more or less be consumed. When the mixed liquor reaches the bottom it will again be sucked through the conduit 10 or 24 at a higher velocity. The conditions of circulation should be so chosen that, when in the circulation returning to the strainer plate, the mixed liquor will still contain some oxygen. Under normal conditions the mixed liquor will in the aerating operation absorb so much air that its oxygen content will amount to about 5 to 7 milligrams per litre, the actual amount being dependent on the nature of the mixed liquor, the temperature thereof as well as of the air blown in, and also upon the ratio between the velocity of liquid flow over the strainer plate and the rate of air supply. Under such circumstances it is usually preferable not to allow the mixed liquor to be exhausted of oxygen to a greater extent than to a residual oxygen content of 0.5-1.5, preferably only to about 1.0 milligram per litre, although it is sometimes possible to leave as much as 2 milligrams per litre in the liquor when it is returned to the aeration device.

The number of circulations required for the perfect purification of the sewage will be obtained by dividing the biochemical oxygen consumption of the fresh sewage, which can be obtained by various known testing methods, by the quantity of oxygen absorbed by the mixed liquor in each passage over the aerating place. If, for instance, the biochemical oxygen consumption is 300 milligrams per litre and the oxygen absorbed in one passage is 5 milligrams per litre, 60 circulations would suffice for complete purification. Normally, the number of circulations actually used should be less than the number required for perfect purification, half of which is in most cases practical.

In the present method of purification the sewage should preferably remain in the aerating installation more than two hours.

The method according to the invention is preferably carried out continuously, fresh sewage being continuously supplied to the tank, and a corresponding quantity of mixed liquor being discharged continuously. It is sometimes advantageous to carry out the process intermittently or partly intermittently.

The sludge percentage of the return sludge should be higher than 50%, preferably more than 70%, e. g. 80–90%, and sometimes up to about 95%. In the present art, sludge percentage is defined as that volume of sludge, expressed in terms of percentage of the volume of the initial suspension, which has settled or deposited from a stationary suspension after a period of time of one hour. The sludge so deposited contains very little dry substance, the water content thereof amounting to about 98.5%. The sludge percentage of the mixed liquor in the aerating tank will vary greatly with the nature of the sewage and other conditions. Although a lower percentage may be used, the sludge percentage should in most cases not be lower than 10%, and usually 15–25% will be advantageous; sometimes it is preferable to use a sludge percentage of the order of 30–35% or even higher.

In most cases it is not practical to treat the sewage in only one apparatus, as shown in Figs. 1 and 2. Therefore, with reference to Fig. 5, a plurality of such apparatus 41 to 45 may be connected in series, the outlet of each apparatus being connected to the inlet of the succeeding one, as by the conduits 46, 47, 48 and 49. The requirement for oxygen of the mixed liquor being higher during the beginning of the treatment, that is in the first aerating tank or tanks of a series, the aeration should be greatest at the beginning of such a series. This can be obtained either through varying the amount of air supplied per unit of time, or by varying the period of circulation, or both. The variation of period of circulation is brought about either by altering the speed of the pump or propeller, or by using tanks of greater capacity in the later units in the series, as shown in Fig. 5. The increase of volume may be successive so that each tank is larger than the preceding one, as tanks 42 to 45. It is also possible to make some successive tanks of equal capacity, as tanks 41 and 42. In one instance when five units were used, it was found suitable to employ a period of circulation of 2–3 minutes in the first tank and 5–6 minutes in the last one. It is also possible to use a combination, not shown in the drawings, of parallel and series connections. In an installation of a plurality of units, by-pass conduits should be employed so as to enable any unit to be cut off for repair or cleansing.

When employing a plurality of removable units in series, such as an apparatus as shown in Figs. 3 and 4, the accommodation to varying oxygen requirement in the different steps may easily be obtained by regulating the adjacency of succeeding units, the distance between the units being less in the beginning of a series than at the end thereof. Especially when the number of units is small, say 5 or 6, it is advisable to provide partitions between the individual units, at least at the beginning of the series, so as to avoid short-circuiting of sewage through the apparatus.

Subsequent to the aeration treatment, the mixed liquor is subjected to slow agitation, preferably in a special tank which, in the case illustrated in Fig. 5, is divided in two chambers 50 and 51 communicating with each other through a conduit 64 at the bottom. Each chamber is equipped with an agitator shaft 52 having secured thereto paddle arms 53 cooperating with baffles 54 secured to the walls of the tank. The shafts 52 rotate in bottom bearings, each preferably consisting of a cast iron plate 55 upon which the end of the vertical shaft 52 rests, and which is surrounded by a ring 56 of, for instance, lignum vitae. At the upper ends the shafts 52 rotate in bearings 57. The motor 58 drives the agitators through the bevel gears 59 on the motor shaft 62 and bevel gears 60 and 61 on the agitator shafts 52 for tanks 50 and 51, respectively. The speed of agitation should nowhere in the mixed liquor exceed 40 centimetres per second, 20–30 centimetres per second, or even less, being preferred.

Due to the violent and intensive mechanical treatment by the air and the propeller in the aeration step, the individual sludge floccules will be disintegrated to small particles which, of course, is of great advantage for the purification proper, but results in difficulties in the subsequent flocculation in the settling tanks. By slowly agitating the aerated mixed liquor, as stated, it was surprisingly found that the small particles reaggregate to larger floccules which settle very rapidly.

In the complete procedure of purifying sewage, said sewage is admitted to the aeration tanks through inlet 4 together with return sludge supplied through pipe 16 (or 6 in the embodiments of Figs. 1–4). After passing through the aerating tanks 41 to 45, the mixed liquor escapes through outlet 5 to be transmitted to the agitator 50 through its inlet 63, and from there to agitator 51 through conduit 64. From the agitators the mixed liquor is taken through outlet 65 and pipe 66 to the sedimentation tank 67 which may be provided, in known manner, with inclined walls to facilitate the accumulation of sludge at the bottom. From the sedimentation tank 67, the sludge is removed automatically through pipes 68 and 69 to be partly dispensed with through pipe 70 and its valve 71 and partly returned by pump 74 through pipe 72 and its valve 73 to the aerating tanks through inlet 16 and 4 (or 6). The pipe 66 preferably opens into a baffle cylinder 75 so as to prevent a short-circuiting to the peripheral outlet duct 76 which collects the purified water and leads it to the outlet pipe or drain 77.

What we claim is:

1. A method of purifying impure waters, including sewage, according to the activated sludge method, consisting in aerating the mixed liquor of sewage and activated sludge with a gas containing free oxygen, subjecting said mixed liquor after aeration to slow agitation so as to expedite controlled aggregating of the particles suspended in the water, and subjecting the mixed liquor so agitated to settling to separate purified water from sludge.

2. A method of purifying impure waters, including sewage, according to the activated sludge method, comprising the steps of aerating the mixed liquor of impure water and activated sludge with a gas containing free oxygen under such violent conditions as to disintegrate the particles of activated sludge and impurities to a finely divided state, subjecting the mixed liquor after aeration to slow agitation so as to expedite the aggregation of the finely divided particles suspended in the water and thereby increase the settling speed thereof, and subsequently subjecting said agitated mixed liquor to settling to separate the sludge and purified water.

ALEF RUBEN PERSSON.
JOHAN OLOF NAUCLÉR.